US006937963B2

(12) United States Patent
Ishii et al.

(10) Patent No.: US 6,937,963 B2
(45) Date of Patent: Aug. 30, 2005

(54) METHOD FOR AVOIDING IRREGULAR SHUTOFF OF PRODUCTION EQUIPMENT AND SYSTEM FOR AVOIDING IRREGULAR SHUTOFF

(75) Inventors: Ken Ishii, Kanagawa-ken (JP); Takashi Nakao, Kanagawa-ken (JP); Yukihiro Ushiku, Kanagawa-ken (JP); Shuichi Samata, Kanagawa-ken (JP)

(73) Assignee: Kabushiki Kaisha Toshiba, Toshiba (JP)

( * ) Notice: Subject to any disclaimer, the term of this patent is extended or adjusted under 35 U.S.C. 154(b) by 129 days.

(21) Appl. No.: 10/228,110

(22) Filed: Aug. 27, 2002

(65) Prior Publication Data

US 2003/0158705 A1 Aug. 21, 2003

(30) Foreign Application Priority Data

Aug. 31, 2001 (JP) ..................................... P2001-264286

(51) Int. Cl.[7] .......................... G06F 11/30; G06F 15/00; G21C 17/00
(52) U.S. Cl. ....................... 702/185; 702/184; 700/266; 700/121; 700/123
(58) Field of Search .............................. 702/34, 35, 36, 702/182, 183, 184, 185; 700/29, 30, 32, 108, 121, 123, 174, 175, 177, 266, 283

(56) References Cited

U.S. PATENT DOCUMENTS

| 5,146,417 | A | * | 9/1992 | Watson ......................... 702/85 |
| 5,210,704 | A | * | 5/1993 | Husseiny ...................... 702/34 |
| 5,406,502 | A | * | 4/1995 | Haramaty et al. ........... 702/183 |
| 5,501,105 | A | * | 3/1996 | Hernandez et al. ........... 73/660 |
| 5,586,066 | A | * | 12/1996 | White et al. ................. 702/181 |
| 5,610,339 | A | * | 3/1997 | Haseley et al. ............... 73/660 |
| 5,710,723 | A | * | 1/1998 | Hoth et al. .................. 702/181 |
| 5,870,699 | A | * | 2/1999 | Canada et al. .............. 702/190 |
| 5,979,225 | A | | 11/1999 | Zhou |
| 6,185,472 | B1 | | 2/2001 | Onga et al. |
| 6,199,018 | B1 | * | 3/2001 | Quist et al. .................... 702/34 |
| 6,208,953 | B1 | * | 3/2001 | Milek et al. .................... 703/7 |
| 6,226,597 | B1 | * | 5/2001 | Eastman et al. .............. 702/34 |
| 6,260,004 | B1 | * | 7/2001 | Hays et al. .................. 702/183 |
| 6,297,742 | B1 | * | 10/2001 | Canada et al. .............. 340/635 |
| 6,392,584 | B1 | * | 5/2002 | Eklund ........................ 341/183 |
| 6,434,512 | B1 | * | 8/2002 | Discenzo ..................... 702/184 |

FOREIGN PATENT DOCUMENTS

| JP | 10-220372 | 8/1998 |
| JP | 2000-283056 | 10/2000 |

OTHER PUBLICATIONS

Chang et al. "Continuous Equipment Diagnosis Using Evidence Integration: An LPCVD Application", IEEE, 1991.*
Jerome T. Conner et al., "Recurrent Neural Networks and Robust Time Series Prediction," IEEE Transactions on Neural Networks, vol. 5, No. 2, pp. 240–254, Mar. 1994.

*Primary Examiner*—Patrick J Assouad
(74) *Attorney, Agent, or Firm*—Finnegan, Henderson, Farabow, Garrett & Dunner, L.L.P.

(57) ABSTRACT

A method for avoiding irregular shutoff of production equipment, includes: measuring regularly time-series data of characteristics of a rotary machine used in the production equipment running for the production; obtaining first failure diagnosis data subjecting the time-series data to a first real-time analysis; obtaining second failure diagnosis data subjecting the first failure diagnosis data to a second real-time analysis; predicting a status of the production equipment several minutes later using the second failure diagnosis data; and shutting off during a production process if the result of the prediction determines that the production equipment will shut off irregularly, and switching to a purge sequence for conducting a gas purge of the production equipment.

20 Claims, 4 Drawing Sheets

U.S. PATENT DOCUMENTS

| | | | |
|---|---|---|---|
| 6,438,440 B1 * | 8/2002 | Hayashi | 700/121 |
| 6,526,831 B2 * | 3/2003 | Ben-Romdhane | 73/660 |
| 6,665,576 B2 * | 12/2003 | Hayashi | 700/121 |
| 2002/0083773 A1 * | 7/2002 | Ben-Romdhane | 73/660 |
| 2003/0009311 A1 * | 1/2003 | Ushiku et al. | 702/184 |
| 2003/0143747 A1 * | 7/2003 | Bondestam et al. | 436/34 |
| 2003/0149547 A1 * | 8/2003 | Nakao et al. | 702/183 |
| 2003/0154052 A1 * | 8/2003 | Samata et al. | 702/184 |

* cited by examiner

METHOD FOR AVOIDING IRREGULAR SHUTOFF OF PRODUCTION EQUIPMENT AND SYSTEM FOR AVOIDING IRREGULAR SHUTOFF

CROSS REFERENCE TO RELATED APPLICATIONS

This application is based upon and claims the benefit of priority from prior Japanese Patent Application P2001-264286 filed on Aug. 31, 2001; the entire contents of which are incorporated herein by reference.

BACKGROUND OF THE INVENTION

1. Field of the Invention

The present invention relates to a method for avoiding irregular shutoff of production equipment equipped with a vacuum pump and a system for avoiding irregular shutoff.

2. Description of the Related Art

Using failure prediction techniques for a vacuum pump attached to semiconductor production equipment, a life expectancy prediction may be made for a vacuum pump from a long-term perspective in order to perform scheduled maintenance. However, since a thin film deposition is carried out under a plurality of processing conditions having varying pump loads during normal operation of the production equipment, in cases where film deposition is carried out under process conditions where a pump load is high, there are times when the vacuum pump will suddenly shut off during the film deposition.

If such a situation occurs, in many cases entire product lots in the middle of the film deposition process will be lost. In addition, due to irregular shutoff of the vacuum pump during the film deposition, it is possible that a highly reactive gas and/or a highly toxic gas may be released into the air when the vacuum pump is replaced, deteriorating the work environment and causing problems for employee health maintenance. In particular, in a case of semiconductor production equipment, there are times where a highly toxic gas such as arsine ($AsH_3$), phosphine ($PH_3$), or diborane ($B_2H_6$) is used. If the vacuum pump suddenly shutoffs while using these gases, the possibility of serious or even life-threatening accidents happening cannot be ruled out. In the case of the vacuum pump for evacuating such highly toxic gases and/or highly reactive gases, there are situations where special measures, such as replacing the vacuum pump in a draft chamber, must be taken. Therefore, depending on the type of the gas used, more labor hours may become necessary than for an ordinary pump exchange.

In addition, maintenance may be performed after a vacuum pump life expectancy prediction or a prediction of when an irregular shutoff caused by motor current or the temperature of a cooler within the vacuum pump may occur according to experience-based equipment management. However, depending on the gas used, even if these parameters fall within a normal range of values, the vacuum pump may be in trouble. Therefore, whether in a single process or in multiple processes, it is impossible to assess a failure using only these parameters. Furthermore, due to the fact that only pump data is analyzed, in the case where the multiple processes are performed the parameters monitored fluctuate greatly because the pump load varies with each condition, and a life expectancy prediction is impossible.

As described above, in cases corresponding to production of various kinds of industrial products, when the same production equipment is used to manufacture various kinds of industrial products, the required process conditions are diverse, and there is a problem in that it is impossible to determine a universal threshold or criteria for production equipment failure prediction.

SUMMARY OF THE INVENTION

According to a first aspect of the present invention, a method for avoiding irregular shutoff of production equipment, includes: measuring regularly time-series data of characteristics of a rotary machine used in the production equipment running for the production; obtaining first failure diagnosis data subjecting the time-series data to a first real-time analysis; obtaining second failure diagnosis data subjecting the first failure diagnosis data to a second real-time analysis; predicting a status of the production equipment several minutes later using the second failure diagnosis data; and shutting off during a production process if the result of the prediction determines that the production equipment will shut off irregularly, and switching to a purge sequence for conducting a gas purge of the production equipment.

According to a second aspect of the present invention, a system for avoiding irregular shutoff of production equipment, includes: a production chamber performing a production process of the production equipment; a rotary machine processing a load of the production process; sensors measuring time-series data of characteristics of the rotary machine and outputting the time-series data in real time; a real-time failure diagnosis module configured to perform a first real-time analysis on the time-series data so as to obtain first failure diagnosis data, to perform a second real-time analysis on the first failure diagnosis data so as to obtain second failure diagnosis data, and to predict future status of production equipment based upon the second failure diagnosis data; and a real-time controller configured to perform and control the production process, and to direct the production equipment to introduce a purge gas if the real-time failure diagnosis module determines that during the production process the production equipment may have an irregular shutoff.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 1:
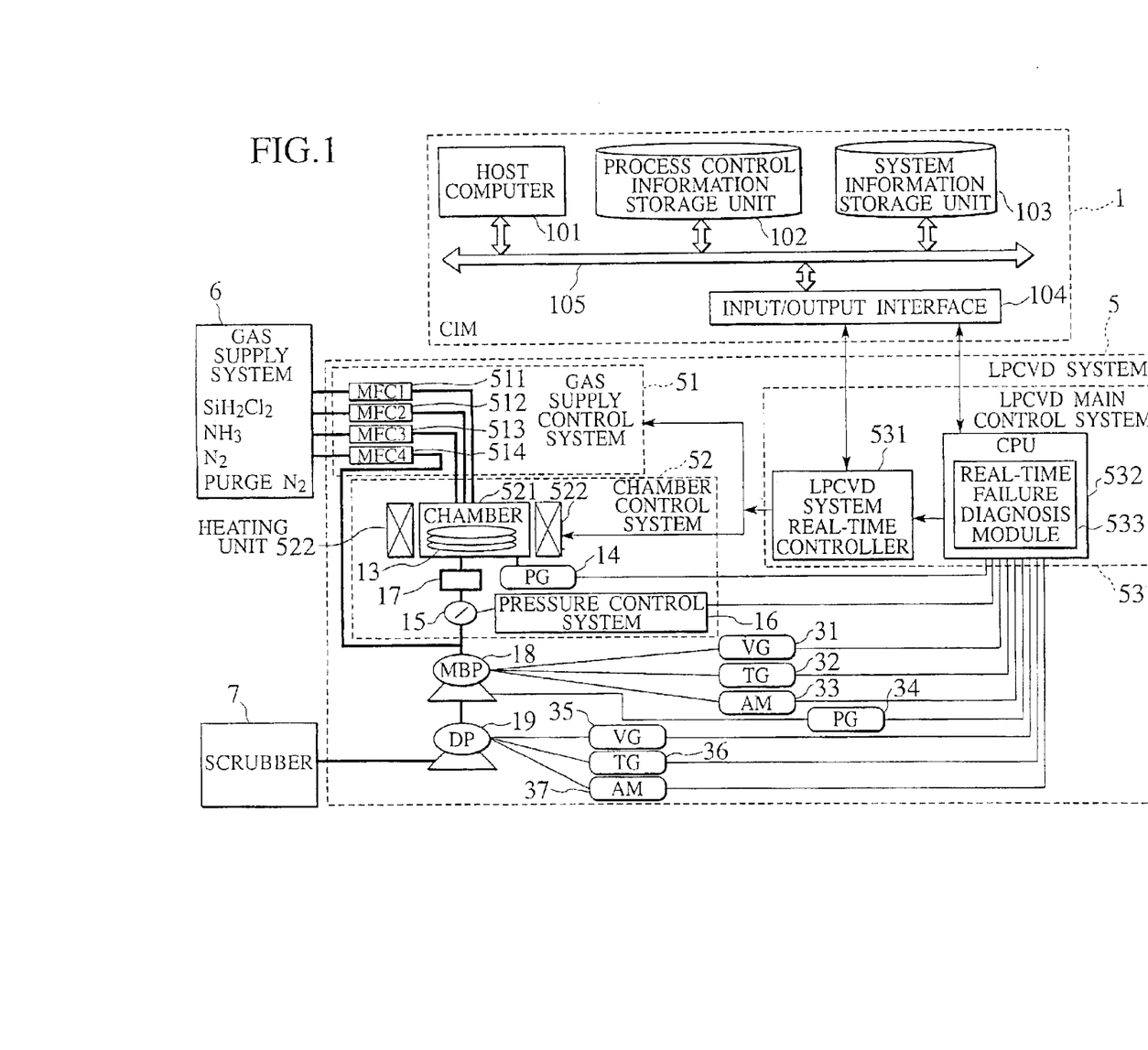
FIG. 1 is schematic diagram of an irregular shutoff avoidance system according to an embodiment of the present invention.

An irregular shutoff avoidance system according to an embodiment of the present invention is described as the system depicted in FIG. 1, which is constructed by a low pressure chemical vapor deposition (LPCVD) system 5 for growing a silicon nitride film ($Si_3N_4$ film) and a computer integrated manufacturing (CIM) equipment 1 for performing control/management of the LPCVD system 5. As shown in FIG. 1, the LPCVD system (production equipment) 5 includes a production chamber 521 having a hermetically sealed structure capable of vacuum pumping. On the exhaust side of the production chamber 521, a vacuum piping is connected, and on the exhaust side of the vacuum piping, a water-cooled trap 17 with a water-cooled plate for allowing collection of solid reaction by-product is connected. On the exhaust side of the water-cooled trap another vacuum piping 17 is connected, and on the exhaust side of this vacuum piping a pressure control valve 15 is connected. On the exhaust side of the pressure control valve 15 an additional vacuum piping is connected, and on the exhaust side of the additional vacuum piping is connected a vacuum pump system, wherein a mechanical booster pump 18 and a dry pump 19 are connected in series to each other so as to evacuate the inside of the production chamber 521. The pressure control valve 15 isolates, if necessary, the production chamber 521 from the vacuum pump system (18, 19) so as to adjust exhaust conductance. Meanwhile, a plurality of gas piping are connected to the production chamber 521, and these gas piping are respectively connected to mass-flow controllers 511, 512, 513, 514, and so on. A gas supply control system 51 has the mass-flow controllers 511, 512, 513, 514, ..., and predetermined gases are supplied to the gas supply control system 51 from a gas supply system 6 of a plant side. More specifically, flow rates of the various source gases and carrier gas to be introduced into the production chamber 521 are respectively controlled by the mass-flow controllers 511, 512, 513, 514, ..., in the gas supply control system 51. The source gases and the like controlled by the gas supply control system 51 pass through gas piping into the production chamber 521, which maintains a low pressure level. An internal temperature of the production chamber 521 is controlled by a heating unit 522, which is formed with a heating part and a temperature measurement instrument.

A film deposition of the silicon nitride film using the LPCVD method includes introducing dichlorosilane ($SiH_2Cl_2$) gas as a silicon source under low pressure via the mass-flow controller 511, and introducing an ammonia gas ($NH_3$) as a nitrogen species via the mass-flow controller 512. These gases then chemically react at around 800° C., depositing a thin film of silicon nitride upon a semiconductor substrate 13. The mass-flow controller 513 controls the introduction of a nitrogen ($N_2$) gas into the production chamber 521. The chemical reaction between the dichlorosilane gas and the ammonia gas at 800° C. produces a silicon nitride material, and also causes an ammonium chloride ($NH_4Cl$) gas and a hydrogen ($H_2$) gas to develop as reaction by-products. The hydrogen in gas form is evacuated by the vacuum pump system (18, 19) used in the LPCVD system 5. Meanwhile, the ammonium chloride is in gas form at the time of formation because the inside of the reactive chamber is at a temperature of approximately 800° C. under low pressure conditions of several hundred Pa or less. As shown in FIG. 1, the LPCVD system 5 typically has a water-cooled trap 17, which collects solid reaction by-product, deployed between the LPCVD system 5 and the vacuum pump system (18, 19). The water-cooled trap 17 plays a role in reducing the amount of ammonium chloride or the by-product material adhered to the pressure adjustment valve 15 or the vacuum pump system (18, 19). The source gas and the reaction by-product gas that pass through the vacuum pump system (18, 19), are removed by a scrubber 7. The scrubber 7 removes harmful components extracted by the vacuum pump system (18, 19) through absorption or chemical reaction.

The internal pressure of the production chamber 521 is measured by a pressure gauge 14, which is connected to the production chamber 521. A capacitance manometer, Pirani gauge, or the like may be used as the pressure gauge 14. A pressure control system 16 is connected to the pressure adjustment valve 15, which adjusts conductance of the evacuation system based on the difference between a measured pressure value, as measured by the pressure gage 14, and a set pressure value, as fixed by a chamber control system 52, so that the internal pressure of the production chamber 521 may reach a preset value and maintain the preset value.

The degree of opening representing the adjustment status of the pressure adjustment valve 15 is output to a LPCVD main control system 53 in real time. In addition, a vibration gauge 31, a temperature gauge 32, and an ammeter 33 are connected to the mechanical booster pump 18, and an exhaust pressure gauge 34 is connected to the exit portion thereof. The ammeter 33 measures current consumed in order to rotate the mechanical booster pump 18. The values measured by the vibration gauge 31, temperature gauge 32, ammeter 33, and exhaust pressure gauge 34, respectively, are output to the LPCVD main control system 53. A vibration gauge 35, a temperature gauge 36, and an ammeter 37 are also connected to a dry pump 19. The ammeter 37 measures consumed current for rotating the dry pump 19. The measured values from the vibration gauge 35, temperature gauge 36, and ammeter 37, respectively, are output to the LPCVD main control system 53. The LPCVD main control system 53 contains an LPCVD system real-time controller 531 and a CPU 532. The LPCVD system real-time controller 531 centrally controls the gas supply control system 51, the heating unit 522, and the pressure control system 16. The CPU 532 includes a real-time failure diagnosis module 533, and the real-time failure diagnosis module 533 performs calculations of failure diagnosis in real time. The real-time failure diagnosis module 533 stores as time-series data the degree of opening of the pressure adjustment valve 15 from the pressure gauge 14 and the pressure control system 16, and respective outputs of the vibration gauge 31, temperature gauge 32, ammeter 33, and exhaust pressure gauge 34 connected to the mechanical booster pump 18, and the vibration gauge 35, temperature gauge 36, and ammeter 37 connected to the dry pump (main pump). Moreover, the real-time failure diagnosis module 533 receives in real time outputs from sensors for characteristics such as the pressure control system 16, the vibration gauges 31, 35, the temperature gauges 32, 36, ammeters 33, 37, or the exhaust pressure gauge 34, performs calculations regarding these outputs in real time, thus generating a first failure diagnosis data group. Factors such as an average value of time-series data, a standard deviation, a covariance in terms of time, and a covariance in terms of space are calculated for the characteristics. The real-time failure diagnosis module 533 then determines in real time whether the vacuum pump system (18, 19) is in a normal state or at a state just before failure based on the group of first failure diagnosis data. Moreover, based on the determination, a command is given to the LPCVD system real-time controller 531 to initiate either an alarm or a shutoff sequence.

The LPCVD system 5 shown in FIG. 1 is connected to CIM equipment 1 for performing production management of a plurality of semiconductor production equipment, and operation of the LPCVD system 5 is controlled by the CIM equipment 1. The CIM equipment 1 includes at least a host computer 101, a process control information storage unit 102, and an system information storage unit 103. The host computer 101, the process control information storage unit 102, and the system information storage unit 103 are connected to one another via a bus 105. In addition, an input/output interface 104 is connected to the bus 105, and the LPCVD system 5 exchanges information with the CIM equipment 1 via the input/output interface 104. Although omitted from the illustrations, in actuality the LPCVD system 5 and the CIM equipment 1 are connected to each other via an information network such as the Internet or a local area network (LAN). The process control information storage unit 102 includes a process control database for managing process information such as the process conditions or a film deposition recipe for the semiconductor substrate 13. Within the process control database, data such as type of product, type of film deposition, process recipe information, temperature/pressure/gas flow rates for the film deposition, and vacuum equipment load testing recipe information are classified and recorded. The LPCVD system real-time controller 531 inputs a film deposition recipe, and a pump load test recipe from the process control information storage unit 102, and interprets them in real time to centrally control the gas supply control system 51, the heating unit 522, and the pressure control system 16. The system information storage unit 103 includes a system information database wherein the output values of the measuring instruments attached to the LPCVD system 5 and the vacuum pump system (18, 19) are organized by state at each stage under each film deposition condition and recorded. More specifically, time-series data, such as temperature, power consumption and current in the vacuum pump, corresponding statistical data and data forming the Mahalanobis space, time-series data, such as the temperature and pressure of the production chamber 521 and the pressure adjustment valve 15, corresponding statistical data, and data, such as the thickness of an accumulated film, amount of integrated gas flow (over time), and differences among individual pumps is classified and recorded into the system information database. The measuring instrument output data recorded in the system information storage unit 103 is classified/organized and recorded by the condition, or similar conditions, under which a film corresponding to a product in the process control information storage unit 102 is deposited. In addition, output from each measuring instrument in a reference semiconductor production equipment (LPCVD system), either in the same plant as the LPCVD system 5 or in another, connected to the network is similarly respectively recorded in the system information storage unit 103 via the main control unit of that equipment. The real-time failure diagnosis module 533 obtains statistical characteristics values such as average over time, standard deviation, and auto covariance as well as obtaining the Mahalanobis distance from the Mahalanobis space (reference space) of the multivariate found from the measured values and the characteristics values stored in the system information storage unit 103, and determining in real time whether the vacuum pump system (18, 19) is in a normal state or at a state just before failure.

Figure 2:
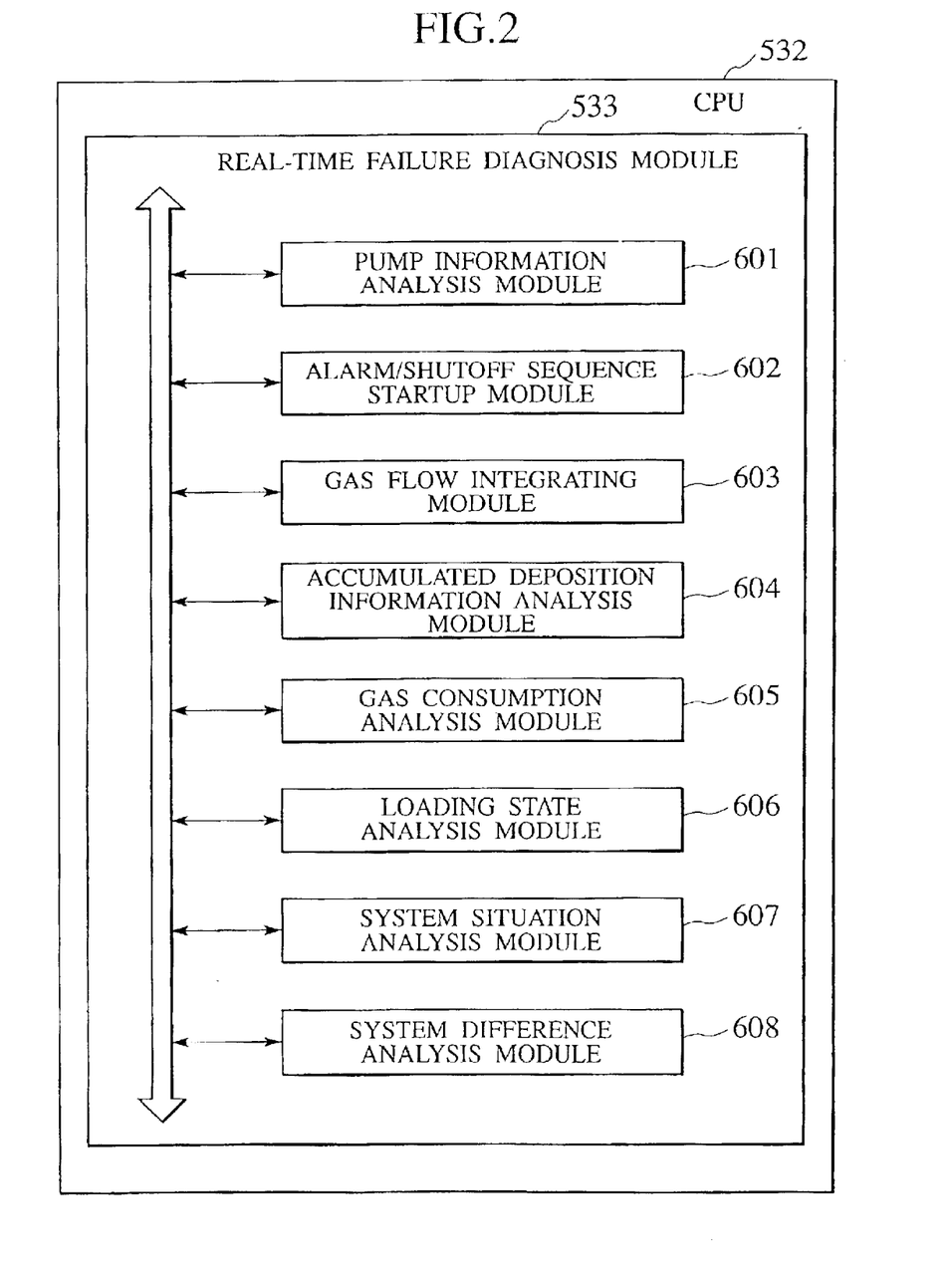
FIG. 2 is a block diagram for describing the structure of a real-time failure diagnosis module according to an embodiment of the present invention.

As shown in FIG. 2, the real-time failure diagnosis module 533 includes at least a pump information analysis module 601, an alarm/shutoff sequence start-up module 602, a gas flow integrating analysis module 603, an accumulated deposition information analysis module 604, a gas consumption analysis module 605, a loading state analysis module 606, a system situation analysis module 607, and a system difference analysis module 608. Here, if the vacuum pump has an irregular shutoff during the film deposition, the alarm/shutoff sequence start-up module 602 sends a deposition stop signal to the film deposition equipment to cause the deposition process to halt, and switches to a purge sequence. In addition, the gas flow integrating analysis module 603 performs analysis using the integrated amount of inflow gas over time for each type of gas and the inflow time as analytical parameters. Moreover, the accumulated deposition information analysis module 604 performs analysis using accumulated film thickness information as an analytical parameter. The gas consumption analysis module 605 performs analysis using the amount of gas consumption for each type of gas under each process condition as an analytical parameter. Moreover, the loading state analysis module 606 performs analysis using information regarding conditions in the production chamber 521 (i.e. wafer full-charged or an empty boat) as analytical parameters. Moreover, the system situation analysis module 607 uses system situation information (piping length, and pressure) as an analytical parameter. The system difference analysis module 608 performs analysis using the differences in vacuum pumps among the equipment of the system as an analytical parameter.

Figure 3:
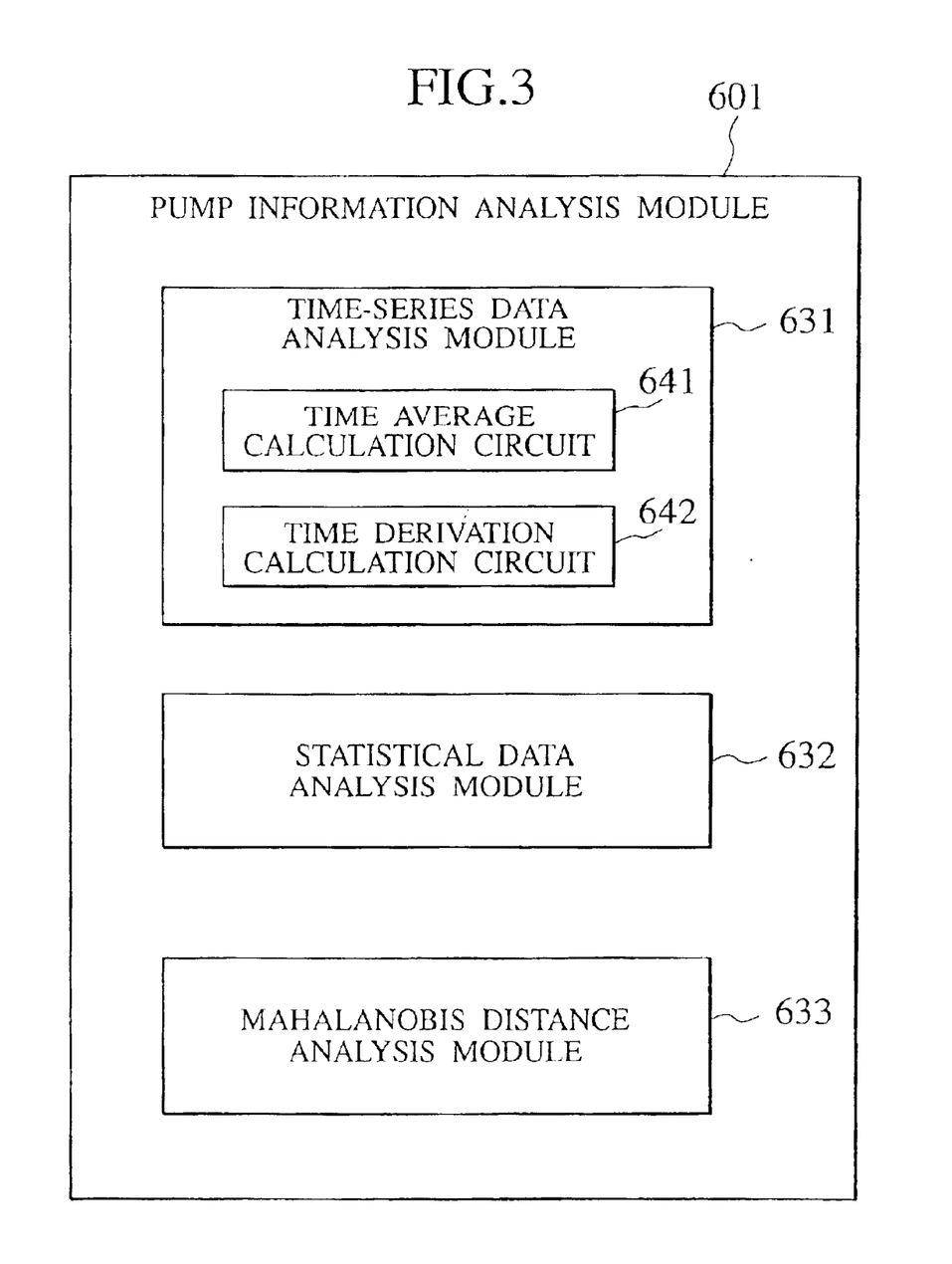
FIG. 3 is a block diagram for describing the structure of a pump information analysis module according to an embodiment the present invention.

Note that the pump information analysis module 601, as shown in FIG. 3, includes a time-series data analysis module 631, a statistical data analysis module 632, and a Mahalanobis distance analysis module 633. The time-series data analysis module 631 performs a first real-time analysis of the time-series data from the sensors for characteristics such as the pressure control system 16, the vibration gauges 31, 35, the temperature gauges 32, 36, the ammeters 33, 37, and the exhaust pressure gauge 34 as shown in FIG. 1, generating a first failure diagnosis data group. A group of statistical data, such as the average value, the standard deviation, the auto covariance relating to time, and the auto covariance relating to space for time-series data of characteristics, is calculated as the first failure diagnosis data group. Accordingly, the time-series data analysis module 631 comprises a time average calculation circuit 641, a time derivation calculation circuit 642 and the like. The statistical data analysis module 632 performs a second real-time analysis of the group of statistical data (the first failure diagnosis data group) generated by the time-series data analysis module 631, generating a second failure diagnosis data group. Meanwhile, the Mahalanobis distance analysis module 633 reads out the data group for defining the Mahalanobis space from the system information storage unit 103, and calculates Mahalanobis distances.

Figure 4:
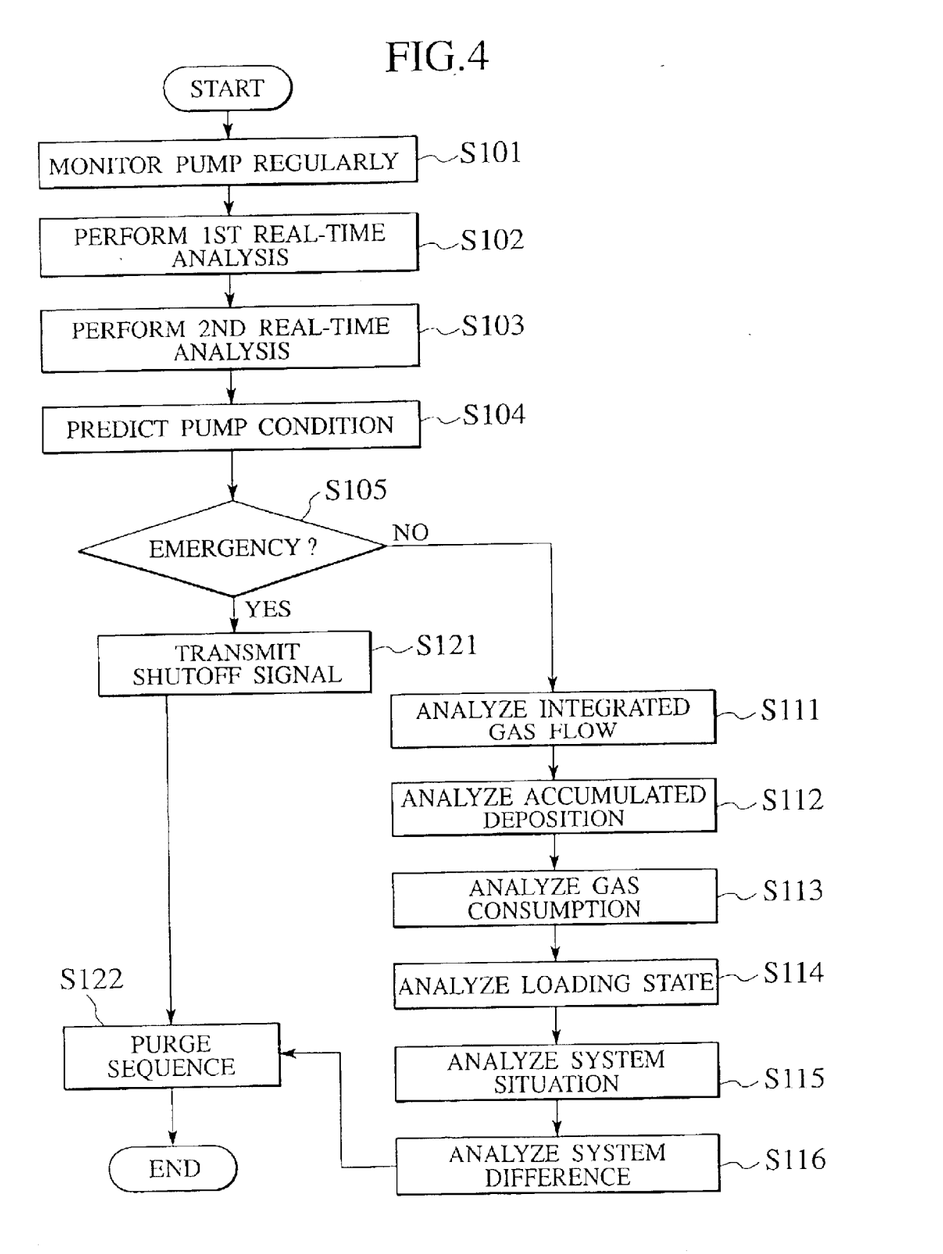
FIG. 4 is a flowchart for describing an irregular shutoff avoidance method according to an embodiment of the present invention.

Referring to the flowchart shown in FIG. 4, an irregular shutoff avoidance method, according to an embodiment of the present invention, is described herein.

(a) To begin with, in step S101, information on the vacuum pump system (18, 19) is regularly monitored by the sensors of characteristics such as the pressure control system 16, vibration gauges 31, 35, temperature gauges 32, 36, ammeters 33, 37, and exhaust pressure gauge 34. The obtained time-series data for the characteristics is input to the real-time failure diagnosis module 533.

(b) In step S102, the real-time failure diagnosis module 533 performs a first real-time analysis based upon the information obtained in step S101 from the sensors, such as the pressure control system 16, vibration gauges 31, 35, temperature gauges 32, 36, ammeters 33, 37, and exhaust pressure gauge 34, generating a first failure diagnosis data group. For example, the average value, the standard deviation, the auto covariance relating to time, and the auto covariance relating to space for the time-series data of the characteristics are calculated so as to obtain the first failure diagnosis data group. The obtained first failure diagnosis data group is sent to the system information storage unit 103 in the CIM equipment 1, and recorded in the system information database of the system information storage unit 103.

(c) Afterwards, in step S103, the real-time failure diagnosis module 533 performs a second real-time analysis based upon the first failure diagnosis data group generated in step S102, thus generating a second failure diagnosis data group. In order to generate the second failure diagnosis data group, a group of reference data, such as the Mahalanobis space, may be read out from the system information storage unit 103 and analysis performed based upon the relationship of that group with the reference data. The second failure diagnosis data group that is obtained is then sent to the system information storage unit 103 in the CIM equipment 1, and recorded in the system information database of the system information storage unit 103.

(d) Next, in step S104, the real-time failure diagnosis module 533 predicts what the status of the vacuum pump system (18, 19) will be in several minutes based upon the second failure diagnosis data group obtained through the analysis of step S103.

(e) In step S105, through comparison to a predetermined threshold it is determined and decided whether or not the vacuum pump system (18, 19) will experience irregular shutoff during the running time of the current process for the film deposition. If it is determined in step S105 that the vacuum pump will experience irregular shutoff, processing proceeds to step S121, in which a film deposition stop signal is sent to the LPCVD system real-time controller 531. The LPCVD system real-time controller 531 then drives the gas supply control system 51, and switches to a purge sequence in step S122. In step S122, the output of the heating unit 522 is reduced in order to start decreasing the temperature of the semiconductor substrate 13 being processed. In the purge sequence of step S122, as the temperature of the semiconductor substrate 13 being processed starts to decrease, the flow rates of the respective mass-flow controllers 511, 512 becomes zero and the introduction of dichlorosilane gas and ammonia gas into the production chamber 521 is stopped. When the pressure inside the production chamber 521 is reduced to a predetermined pressure, the purge gas of nitrogen ($N_2$) is introduced into the production chamber 521 via the mass-flow controller 514. During a fixed time period, gas purging is performed and the vacuum pump system (18, 19) is halted. Accordingly, the 'predetermined threshold' of step S105, which is a reference for determining whether or not irregular shutoff may occur, is set to a value reflecting the time period expected for gas purging.

(f) In step S105, if it is determined that the vacuum pump system (18, 19) will not experience irregular shutoff, processing proceeds to step S111. In step S111, the real-time failure diagnosis module 533 performs, in real time, the analysis of failure diagnosis of the vacuum pump system (18, 19) using the amount of the integrated inflow of gas for each type of gas and the inflow time period as analytical parameters. While omitted from the illustration of FIG. 4, based upon the amount of integrated inflow of gas and the inflow time period for each type of gas monitored in real time, whether or not the vacuum pump system (18, 19) may experience irregular shutoff is determined through the procedure of steps S102 to S105. If it is determined in step S105 that the pump will have an irregular shutoff, processing proceeds to step S121, and then switches to the purge sequence in step S122, as described above.

(g) At the same time, in step S112, the real-time failure diagnosis module 533 uses the accumulated deposition information as an analytical parameter. While omitted from the illustration, based upon the accumulated deposition information monitored in real time, whether or not the vacuum pump system (18, 19) may experience irregular shutoff is determined through the procedure in steps S102 to S105. If it is determined in step S105 that the pump will experience irregular shutoff, processing proceeds to step S121.

(h) In step S113, the real-time failure diagnosis module 533 performs, in real time, the analysis of failure diagnosis of the vacuum pump system (18, 19) using the consumed amount of each type of gas for each process condition as an analytical parameter. Based on the consumed amount of each type of gas for each process condition monitored in real time, whether or not the vacuum pump system (18, 19) may have an irregular shutoff is determined through the procedure of steps S102 to S105.

(i) In step S114, the real-time failure diagnosis module 533 performs analysis for failure diagnosis of the vacuum pump system (18, 19) using loading state information, e.g., information about whether or not a wafer is fully charged, or is an empty boat. Since the loading state information is fixed information, its usage in combination with the characteristics data or the other time-series data enables real time analysis. Therefore, even in this case, based upon the combined information with the other characteristics, whether or not the vacuum pump system (18, 19) will have an irregular shutoff may be determined through the procedure of steps S102 to S105.

(j) In step S115, the real-time failure diagnosis module 533 performs analysis for failure diagnosis of the vacuum pump system (18, 19) using an aspect of the system other than the loading state (e.g., the length of piping, pressure, and the like) as an analytical parameter. Since information regarding system aspect is fixed information, its usage in combination with characteristics data or the other time-series data enables real time analysis. As described above, the information of the system situation combined with the other characteristics is subjected to the procedure in steps S102 through S105.

(k) In step S116, the real-time failure diagnosis module 533 performs analysis for failure diagnosis of the vacuum pump system (18, 19) using the difference in pumps among the equipment in the system as an analytical parameter. Since information regarding such system difference is fixed information, its usage, combined with characteristics data or other time-series data, enables a real time analysis. Accordingly, in this case as well, the combined information is subjected to the procedure of steps S102 through S105.

(l) When the scheduled film deposition is completed, processing switches to the purge sequence in step S122 initiating a shutoff operation.

Continuously executing the aforementioned steps S101 through S116 allows avoidance of trouble such as irregular shutoff of the vacuum pump system (18, 19) during film deposition, enabling the product lot being processed to be saved and a pump exchange operation to be performed under safe conditions (i.e., conditions where any non-process gas is enclosed). Note that steps S111 through S116 may be executed either at the same time, or at different timings. Moreover, it is not always necessary to execute all of steps S111 through S116; portions thereof may be omitted.

Moreover, other than the steps S111 through S116, a step of predicting the amount of by-product material within the vacuum pump system (18, 19), adding the result as a parameter, and performing analysis may be added. With the status of the equipment including the predicted amount of by-product material as a parameter, even if the information given by the vacuum pump system (18, 19) includes fixed values or minute changes, failure prediction and risk prediction may be performed. In the case where a monitored value (e.g., a current value) changes, differing weights for changes may be imposed just after the exchange of the vacuum pump system (18, 19) and at the time where the accumulated film thickness is 10 $\mu$m.

Other Embodiments

While the above embodiment has described the present invention, it should not be taken as meaning that the present invention is limited to the description and the drawings configuring a part of this disclosure. From this disclosure, a variety of substitutable embodiments and operational techniques will become apparent to those with regular skill in the art.

In the embodiment that is given, LPCVD equipment is described by means of an example; however, naturally, the present invention is not limited to the LPCVD equipment. For example, other semiconductor manufacturing equipment, such as dry etching equipment or ion implantation equipment may also be utilized. Moreover, production equipment or manufacturing equipment used for chemical plants or steel plants other than semiconductor production equipment may be utilized.

A combination of a mechanical booster pump and a dry pump connected in series is illustrated as a vacuum pump system; however, a vacuum pump system where a mechanical booster pump and an oil-sealed rotary pump are connected in series may also be used. Moreover, a vacuum pump system including only a dry pump or an oil-sealed rotary pump, or a turbo-molecular pump may also be used.

While the aforementioned embodiment illustrates a configuration where the process control information storage unit 102 and the system information storage unit 103 are integrated in the CIM equipment, the CIM equipment may be omitted by connecting the process control information storage unit 102 and the system information storage unit 103 to the LPCVD system 5 side. In other words, an irregular shutoff avoidance method and system may control a plurality of production equipments as manufacturing steps beginning at the upper level, and may be configured as independent, individual production equipment besides the configuration with a group controller or the CIM equipment using a network, etc.

Various modifications will become possible for those skilled in the art after receiving the teachings of the present disclosure without departing from the scope thereof. Accordingly, it is natural that the present invention includes a variety of embodiments not described herein. The technical scope of the present invention described should be defined only based upon the following appropriate claims.

What is claimed is:

1. A method for avoiding irregular shutoff of a production equipment, comprising:
    measuring regularly time-series data of characteristics of a rotary machine used in the production equipment during a production process;
    performing a first real-time analysis on the time-series data so as to obtain first failure diagnosis data;
    performing a second real-time analysis on the first failure diagnosis data so as to obtain second failure diagnosis data;
    predicting a status of the production equipment using the second failure diagnosis data; and
    stopping the production process if it is determined from the predicted status of the production equipment that during the production process the production equipment may have an irregular shutoff, and switching to a purge sequence for directing the production equipment to introduce a gas purge.

2. The method of claim 1, wherein the rotary machine is a vacuum pump.

3. The method of claim 1, wherein the production equipment is a semiconductor production equipment.

4. The method of claim 2, wherein the characteristics include vibration, temperature, motor current, and exhaust pressure of the vacuum pump.

5. The method of claim 3, wherein the semiconductor production equipment is an LPCVD equipment.

6. The method of claim 3, wherein an integrated amount and inflow time of inflow gas for each gas species are added to analysis parameters in the first real-time analysis.

7. The method of claim 3, wherein accumulated film thickness information of a thin film to be deposited by the production equipment is added to analysis parameters in the first real-time analysis.

8. The method of claim 3, wherein consumed amount of each gas species under each respective condition in the production process is added to analysis parameters in the first real-time analysis.

9. The method of claim 3, wherein a structural parameter of the production equipment and information on the status of a sample to be processed are added to analysis parameters in the first real-time analysis.

10. The method of claim 3, wherein differences among the production equipment are added to analysis parameters in the first real-time analysis.

11. A system for avoiding irregular shutoff of a production equipment comprising:
    a production chamber performing a production process of the production equipment;
    a rotary machine processing a load of the production process;
    sensors measuring time-series data of characteristics of the rotary machine and outputting the time-series data in real time;
    a real-time failure diagnosis module configured to perform a first real-time analysis on the time-series data so as to obtain first failure diagnosis data, to perform a second real-time analysis on the first failure diagnosis data so as to obtain second failure diagnosis data, and to predict future status of production equipment based upon the second failure diagnosis data; and
    a real-time controller configured to perform and control the production process, and to direct the production equipment to introduce a purge gas if the real-time failure diagnosis module determines that during the production process the production equipment may have an irregular shutoff.

12. The system of claim 11, wherein the production equipment includes a gas supply control system configured to introduce gas to the production chamber, and a vacuum pump configured to evacuate the gas.

13. The system of claim 11, wherein the production equipment is semiconductor production equipment.

14. The system of claim 12, wherein the characteristics include the vibration, temperature, motor current, and exhaust pressure of the vacuum pump.

15. The system of claim 13, wherein the semiconductor production equipment is an LPCVD equipment.

16. The system of claim 11, wherein the real-time failure diagnosis module adds an integrated amount and inflow time of an inflow gas for each gas species to analysis parameters for the first real-time analysis.

17. The system of claim 11, wherein the real-time failure diagnosis module adds the accumulated film thickness information of the thin film deposited by the production equipment to analysis parameters for the first real-time analysis.

18. The system of claim 11, wherein the real-time failure diagnosis module adds the consumed amount of each gas species used under each condition of the production process to analysis parameters for the first real-time analysis.

19. The system of claim 11, wherein the real-time failure diagnosis module adds a structural parameter of the production equipment and information on the status of a sample to be processed to analysis parameters for the first real-time analysis.

20. The system of claim 11, wherein the real-time failure diagnosis module adds differences among the production equipment to analysis parameters for the first real-time analysis.

* * * * *